(No Model.)  
J. W. CARPENTER.  
MEAT ROASTER AND BAKER.
No. 426,712. Patented Apr. 29, 1890.
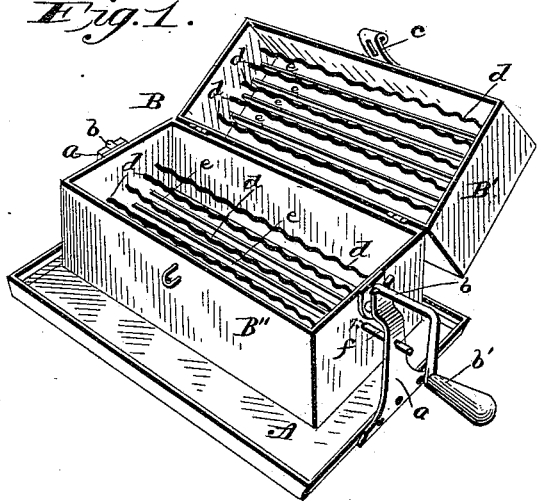
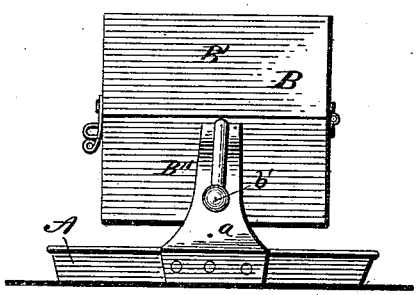
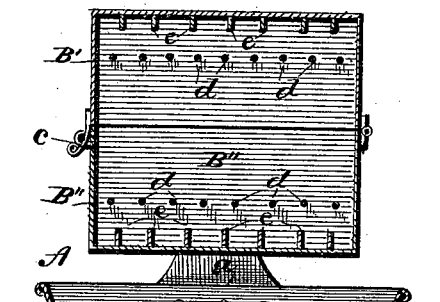
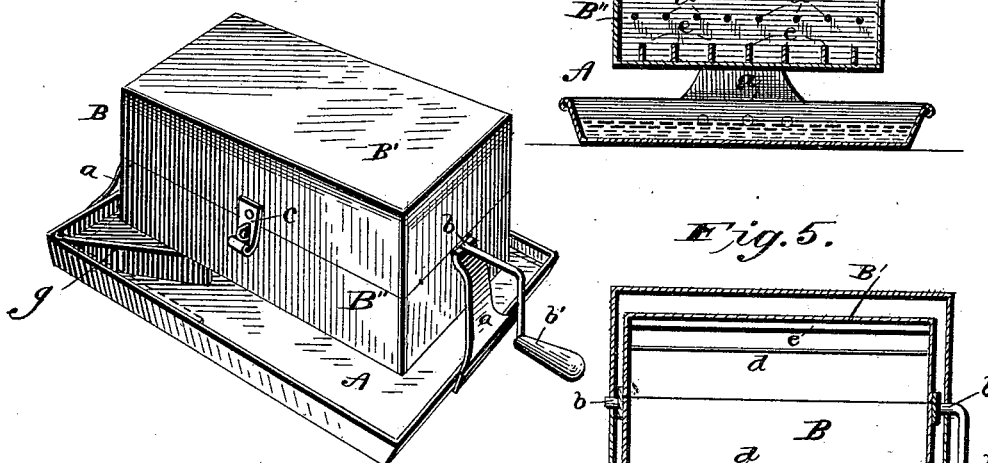
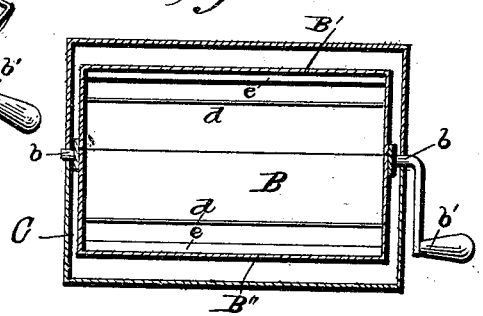
WITNESSES  
INVENTOR  
Attorney (No Model.)
2 Sheets—Sheet 2.
J. W. CARPENTER.
MEAT ROASTER AND BAKER.
No. 426,712. Patented Apr. 29, 1890.
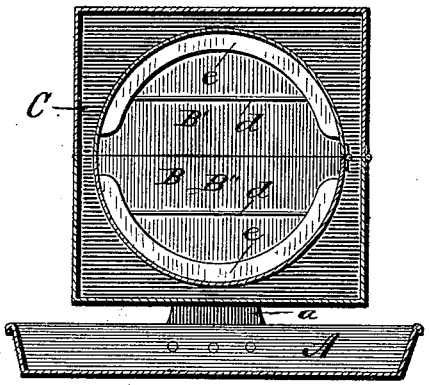
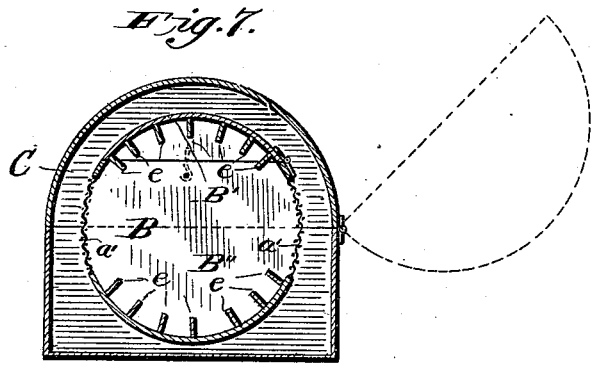
WITNESSES
INVENTOR
J. W. Carpenter
By C. M. Alexander
Attorney

UNITED STATES PATENT OFFICE.

JAMES W. CARPENTER, OF DAYTON, OHIO.

MEAT ROASTER AND BAKER.

SPECIFICATION forming part of Letters Patent No. 426,712, dated April 29, 1890.

Application filed November 5, 1888. Serial No. 289,954. (No model.)

*To all whom it may concern:*

Be it known that I, JAMES W. CARPENTER, a citizen of the United States, residing at Dayton, in the county of Montgomery and State of Ohio, have invented certain new and useful Improvements in Meat Roasters and Bakers, of which the following is a specification, reference being had therein to the accompanying drawings, in which—

Figure 1 represents a perspective view of my improved meat-roaster complete, the oven being thrown open; Fig. 2, an end view of the same, the oven being closed; Fig. 3, a transverse sectional view with the oven closed; Fig. 4, a perspective view with the oven closed; Fig. 5, a longitudinal vertical sectional view of a slightly-modified form of the roaster; and Figs. 6 and 7 are transverse sectional views of different forms of the roaster, which will be fully hereinafter set forth.

The object of this invention, essentially, is to provide a meat-roaster of extremely simple construction, whereby the meat may be thoroughly and uniformly roasted to any degree of doneness desired without in the least burning or scorching the same.

A further object of the invention is to provide means for collecting the juices that fall from the meat and distributing them over the meat at intervals during the roasting process, as will be more fully hereinafter set forth.

The invention has other minor objects in view, which will be fully pointed out hereinafter.

In the accompanying drawings, the letter A designates a shallow pan provided upon opposite sides with standards or supports $a$, these standards being of a suitable height and riveted or formed upon the upturned sides of the pan.

Pivotally supported upon the supports $a$ by means of short shafts $b\ b$ is a revoluble closed oven B, the shafts being secured upon the opposite sides or ends of the oven, and one of them being provided with an operating-crank $b'$, by means of which the said oven B may be revolved or turned upon its axis. The oven B is constructed of two sections B' B", hinged together at one side and provided with a suitable fastening device $c$ upon the opposite side. Each section of the oven is provided with a series of straight or crimped rods $d$, which support the meat or other article placed in the oven to be roasted and prevent it from coming in contact with the top or bottom of the oven. These supporting-rods are placed a suitable distance apart and a suitable distance from the bottom and top of the oven B, and may be arranged longitudinally, as in Fig. 1, or transversely of the same, as shown in Fig. 6. Secured to or formed upon the interior of the top and bottom of the oven are ribs or projections $e$, which may also be either arranged longitudinally, as in Fig. 3, or transversely of the oven, as in Fig. 6. These ribs serve to collect and distribute the juices that fall from the meat over the same whenever the oven is revolved, thus accomplishing the basting process without opening the oven and with nothing but the natural juices of the meat itself. By frequent turning of the oven during the process of roasting or baking, the meat may be uniformly cooked to any degree desired without the least burning or scorching. By means of the distributers $e$ the basting will be thorough and frequent, permitting the meat to absorb its own juice and imparting to it a delicious flavor and richness that would be impossible to obtain with the ordinary methods of roasting. By placing a little water in the pan A the meat may be kept soft and moist during the roasting process, thus providing additional security against burning and imparting additional sweetness and juiciness to the meat. Of course, while this invention is particularly adapted to roasting meats, it is evident that it may be employed for other articles with equal advantage.

To prevent the oven tipping over to one side when an article is placed in it, I may either employ a locking-pin $f$, as shown in Fig. 1, or a pivoted wing $g$, as shown in Fig. 4. The pin $f$ is passed through a hole in one of the standards and inserted in an aperture in the adjacent end of the oven, and the wing $g$ is pivoted in one corner of the pan A, whereby it may either be swung in under the oven to prevent it revolving, as shown in full lines in Fig. 4, or swung to one side, as shown in dotted lines, to permit the oven to turn. The entire device is adapted to be placed in the oven of an ordinary cook-stove. The sections or halves of the oven B may either be constructed of sheet metal or cast, as may be desired.

Instead of pivotally supporting the rotatable oven upon two supports $a$ $a$ erected upon a pan, I may pivot and inclose it in a two-part outer casing C, as shown in Figs. 5, 6, and 7, should I so desire, without in the least departing from the invention. If I so desire, I may also mount this two-part casing C upon the standards $a$ $a$ of the pan.

The revoluble oven B may be made in cylindrical form, as shown in Figs. 6 and 7, or rectangular, as shown in the other figures, without departing from the invention in the least. The supporting-rods $d$ may also be omitted and the meat placed directly upon the basting-strips, as shown in Fig. 7.

A portion of the revoluble oven B may be constructed of wire netting or rods, as shown at $a'$ $a'$, the object in this being to permit the meat to be "browned" or crisped, if desired, the upper portion of the casing C being thrown open, as shown in dotted lines, for this purpose.

The pan A for containing the water and supporting the revoluble oven is an essential feature of this invention, as by means of it the roasting process may be regulated to a nicety. For instance, it frequently occurs that some stove-ovens bake faster on the bottom than on top, and by regulating the quantity of water in the pan this drawback or defect of the stove-oven may be compensated for. By keeping water in the pan A the bottom of the roast is kept in a more moist condition than the top portion, thereby permitting the excessive heat at the top to drive the juices into or through the meat.

I do not desire to limit myself to the exact construction of parts shown and described, but reserve the right to vary the construction consistent with the spirit of the invention.

Having thus fully described my invention, what I claim as new, and desire to secure by Letters Patent, is—

1. In a meat-roaster, the combination of a closed oven adapted to retain the meat juices, supports therefor, and a water-holding tray or pan situated beneath the closed oven, substantially as set forth.

2. In a meat roaster and baker, the combination of a vessel adapted to contain a liquid provided upon two of its opposite sides with standards having bearings in their upper ends, a revoluble two-part closed oven, and horizontal shafts journaled in the bearings in the upper ends of the said standards and attached to one of the parts of the said oven, whereby the oven may be revolved to thoroughly and uniformly cook the article contained in it without losing any of its juices, as described.

3. In a meat-roaster, the combination of the vessel provided with standards on two of its opposite sides, shafts journaled on these standards, a two-part closed oven secured to these shafts, supports for the meat arranged between the oven-shell and its axis, and basters secured upon the interior of the said oven, whereby the oven may be revolved and the roast basted without opening it or removing it from its supporting-standards, substantially as described.

4. The combination of a revoluble two-part oven provided with supporting rods or wires $d$, and the distributing ribs or projections $e$ upon the interior of the oven, substantially as described.

5. The combination, with a two-part revoluble oven, of two groups of distributing ribs or projections secured upon the interior of the said oven upon opposite sides of the same, whereby when the oven is revolved the juices will be collected and distributed over the meat, substantially as described.

6. The combination, with a longitudinally-divided rotatable oven, means for detachably securing the two sections of the oven together, and two groups of basting-ribs, one group being secured upon the interior of each of the said sections, substantially as described.

In testimony whereof I affix my signature in presence of two witnesses.

JAMES W. CARPENTER.

Witnesses:
TOM C. COFFMAN,
D. W. SCHEUFFER.